US011637488B2

United States Patent
Kim et al.

(10) Patent No.: US 11,637,488 B2
(45) Date of Patent: Apr. 25, 2023

(54) ENERGY HARVESTER WITH IRON CORE AND AT LEAST FOUR MAGNET PORTIONS FACING IRON CORE STRUCTURE AND SELF-POWERED GENERATION WIRELESS SENSOR NODES MANAGEMENT SERVER

(71) Applicant: KOREA RAILROAD RESEARCH INSTITUTE, Uiwang-si (KR)

(72) Inventors: Jae Hoon Kim, Goyang-si (KR); Da Hoon Ahn, Suwon-si (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 199 days.

(21) Appl. No.: 17/042,524

(22) PCT Filed: Mar. 29, 2018

(86) PCT No.: PCT/KR2018/003692
§ 371 (c)(1),
(2) Date: Sep. 28, 2020

(87) PCT Pub. No.: WO2019/189960
PCT Pub. Date: Oct. 3, 2019

(65) Prior Publication Data
US 2021/0028680 A1 Jan. 28, 2021

(30) Foreign Application Priority Data
Mar. 26, 2018 (KR) .................. 10-2018-0034613

(51) Int. Cl.
*H02K 35/02* (2006.01)
*G01M 15/05* (2006.01)
(52) U.S. Cl.
CPC ............ *H02K 35/02* (2013.01); *G01M 15/05* (2013.01)

(58) Field of Classification Search
CPC ........ H02K 35/00; H02K 35/02; H02K 35/04; H02K 7/1892; H02N 2/186;
(Continued)

(56) References Cited

U.S. PATENT DOCUMENTS 7,948,124 B1 * 5/2011 Waters ................... H02K 35/00
310/36
9,531,219 B2 * 12/2016 Nam ......................... B60L 5/00
(Continued)

FOREIGN PATENT DOCUMENTS

EP          2677656        12/2013
KR       20160120465       10/2016
(Continued)

OTHER PUBLICATIONS

International Search Report—PCT/KR2018/003692 dated Dec. 26, 2018.
(Continued)

*Primary Examiner* — Maged M Almawri
(74) *Attorney, Agent, or Firm* — Cantor Colburn LLP

(57) ABSTRACT

Provided is an energy harvester and an engine monitoring system. An engine monitoring system using an energy harvester includes at least one or more self-power generation wireless sensor nodes for generating electric energy using the energy harvester and monitoring an engine; and a management server that receives and manages sensing information received from the self-power generation wireless sensor nodes. The self-power generation wireless sensor nodes includes sensor modules monitoring the engine; a data processing unit identifying and packaging sensing information; a wireless communication unit wirelessly transmitting the packaged sensing information to the management server; the energy harvester generating electric energy to be supplied to the sensor modules, the data processing unit, and the
(Continued)

wireless communication unit by converting vibration energy of the engine into the electric energy; and a power management unit controlling the electric energy to supply the electric energy to the sensor modules, the data processing unit.

9 Claims, 7 Drawing Sheets

(58) Field of Classification Search
CPC ............. H04Q 2209/40; B61L 15/0081; B61L 15/0018; G01M 17/08
USPC .................................... 310/12.01, 15, 25, 29
See application file for complete search history.

(56) References Cited

U.S. PATENT DOCUMENTS

| | | | |
|---|---|---|---|
| 9,701,325 B2 * | 7/2017 | Kim | ........................ B61L 27/57 |
| 11,362,575 B1 * | 6/2022 | Bardaweel | ............... H04Q 9/00 |
| 11,460,375 B2 * | 10/2022 | Yamashita | .......... G01M 15/042 |
| 2007/0208841 A1 * | 9/2007 | Barone | ............... B61L 15/0027 709/223 |
| 2012/0089299 A1 | 4/2012 | Breed | |
| 2016/0152252 A1 * | 6/2016 | Kim | .................... B61L 15/0081 701/31.4 |
| 2016/0252071 A1 * | 9/2016 | Phillips | ................. H02M 7/066 290/50 |
| 2017/0088072 A1 | 3/2017 | Curtis et al. | |
| 2017/0150241 A1 * | 5/2017 | Collin | ...................... H04Q 9/14 |
| 2017/0151964 A1 | 6/2017 | Kim et al. | |

FOREIGN PATENT DOCUMENTS

| | | |
|---|---|---|
| KR | 20160135445 | 11/2016 |
| KR | 20170080556 | 7/2017 |

OTHER PUBLICATIONS

Lee, Electromagnetic Vibration Energy Harvest Design Considerations, Journal of the KSME, 2015, vol. 55, Issue 4, pp. 39-42.
European Search Report—European Application No. 18911568.6 dated Dec. 22, 2021, citing US 2016/0152252, US 2017/088072, KR 2016-0135445, U.S. Pat. No. 7,948,124, and EP 2 677 656.

* cited by examiner

ENERGY HARVESTER WITH IRON CORE AND AT LEAST FOUR MAGNET PORTIONS FACING IRON CORE STRUCTURE AND SELF-POWERED GENERATION WIRELESS SENSOR NODES MANAGEMENT SERVER

TECHNICAL FIELD

The present application relates to an energy harvester and an engine monitoring system using the same

BACKGROUND

Various monitoring systems for industrial facilities such as factories or large transportation means (ships, aircrafts, railway vehicles, etc.) relied on a wired sensor monitoring technology, and thus, there was a limitation to guaranteeing reliability and stability during maintenance, repair, and management.

For example, a monitoring system of the related art diagnosed a failure according to state detection information detected by a sensor installed in an industrial facility (a pump, a compressor, etc.) on the ground (or a maintenance depot), and thereby, it was possible to diagnose a state of the industrial facility only in limited installation locations. Accordingly, reliability of diagnosis results was reduced, and there was a limitation in that only diagnosis after occurrence of a failure was possible and prediction and prevention of the failure through real-time monitoring of the industrial facility was impossible.

In particular, there were limitations on access to industrial facilities and components and installation of wired sensors, such as a railway vehicle, a plant, a large ship engine, a power plant, an oil refinery and chemical facility, and production equipment such as a factory, and thus, there was a problem in that it was difficult to obtain real-time monitoring data on major devices.

In order to solve such the problems, research is underway to couple wireless sensors that monitor an operation state of each configuration element of an object such as an industrial facility, but power supply to the wireless sensors is not smooth, and thus, attempts have been made to add a self-power generation module that perform self-power generation from various energy sources existing in an industrial facility.

One of the representative technologies of self-power generation modules is an energy harvesting technology. The energy harvesting technology is a technology which converts energy discarded from the surroundings into electric energy that can be used through harvesting or scavenging.

The energy harvesting technology can absorb natural light energy, low-temperature waste heat energy from a human body or a combustion-type engine, micro-vibration energy from a portable apparatus mounting/attaching device, and dissipated energy from human physical activity, and so on, and can use energy harvesting devices such as a thermoelectric element, electrochemical reaction, a DC/AC generator, a piezoelectric transducer, a capacitor transducer photovoltaic cell, and so on.

In general, a level of power achievable through the energy harvesting technology is approximately microwatts ($\mu$W) to milliwatts (mW).

This energy harvesting technology can be applied to various industrial fields. For example, wireless sensors for monitoring states of various systems such as industrial facilities and components such as railway vehicles, plants, large ship engines, power plants, oil refinery and chemical facilities, and production equipment such as factories can be coupled to the industrial facilities and components, and the detected information can be transmitted through a wireless communication path.

On the other hand, Korean Patent publication No. 10-2017-0080556 (title of invention: ENGINE MONITORING SYSTEM AND METHOD) discloses an engine monitoring system that enables stable engine maintenance by utilizing both static data and dynamic data on a state of an engine during engine monitoring to perform diagnosis of the engine on land etc. and by providing diagnosis information to a ship equipped with the engine.

SUMMARY OF INVENTION

Technical Problem

The present application is to solve the problems of the related art described above and aims to provide an energy harvester capable of self-power generation and an engine monitoring system using the same.

Solution to Problem

As technical means for solving above-described problems, an engine monitoring system using an energy harvester according to a first embodiment of the present application includes at least one or more self-power generation wireless sensor nodes for generating electric energy using the energy harvester and monitoring an engine; and a management server that receives and manages sensing information received from the self-power generation wireless sensor nodes, wherein each of the self-power generation wireless sensor nodes includes at least one or more sensor modules that monitor the engine; a data processing unit that identifies and packages sensing information received from the sensor modules; a wireless communication unit that wirelessly transmits the packaged sensing information received from the data processing unit to the management server; the energy harvester that generates electric energy to be supplied to the sensor modules, the data processing unit, and the wireless communication unit by converting vibration energy of the engine into the electric energy; and a power management unit that controls the electric energy generated by the energy harvester to supply the electric energy to the sensor modules, the data processing unit, and the wireless communication unit.

Meanwhile, an energy harvester according to a second embodiment of the present application includes a power generation core that includes an iron core, a coil wound around the iron core, a first internal magnetic conductor disposed above the coil and coupled to surround an upper end of the iron core, and a second internal magnetic conductor disposed below the coil and coupled to surround a lower end of the iron core, a plurality of magnet portions disposed to face an outer peripheral surface of the power generation core and disposed in an extension direction of the iron core; and a first external magnetic conductor located over the magnet portion and disposed to face the first internal magnetic conductor, and a second external magnetic conductor located under the magnet portion and disposed to face the second internal magnetic conductor, wherein the plurality of magnet portions, the first external magnetic conductor, and the second external magnetic conductor linearly vibrate along the power generation core due to external vibration, and each of the internal magnetic conductors and each of the external magnetic conductors each include a plurality of protrusions protruding to the outside, and when stopped, the respective protrusions face each other or deviate from each other.

Advantageous Effects

According to the above-described problem solving means of the present application, a state in which an upper iron core portion, a lower iron core portion, and a magnet portion of the energy harvester match each other is adjusted by vibration of an engine, resulting in improvement of a rate of change in magnetic flux even with small vibration, and thus, electric energy can be efficiently generated, and the generated electric energy can be used for engine sensing and for transmitting sensing information.

DETAILED DESCRIPTION OF THE EMBODIMENTS

Figure 1:
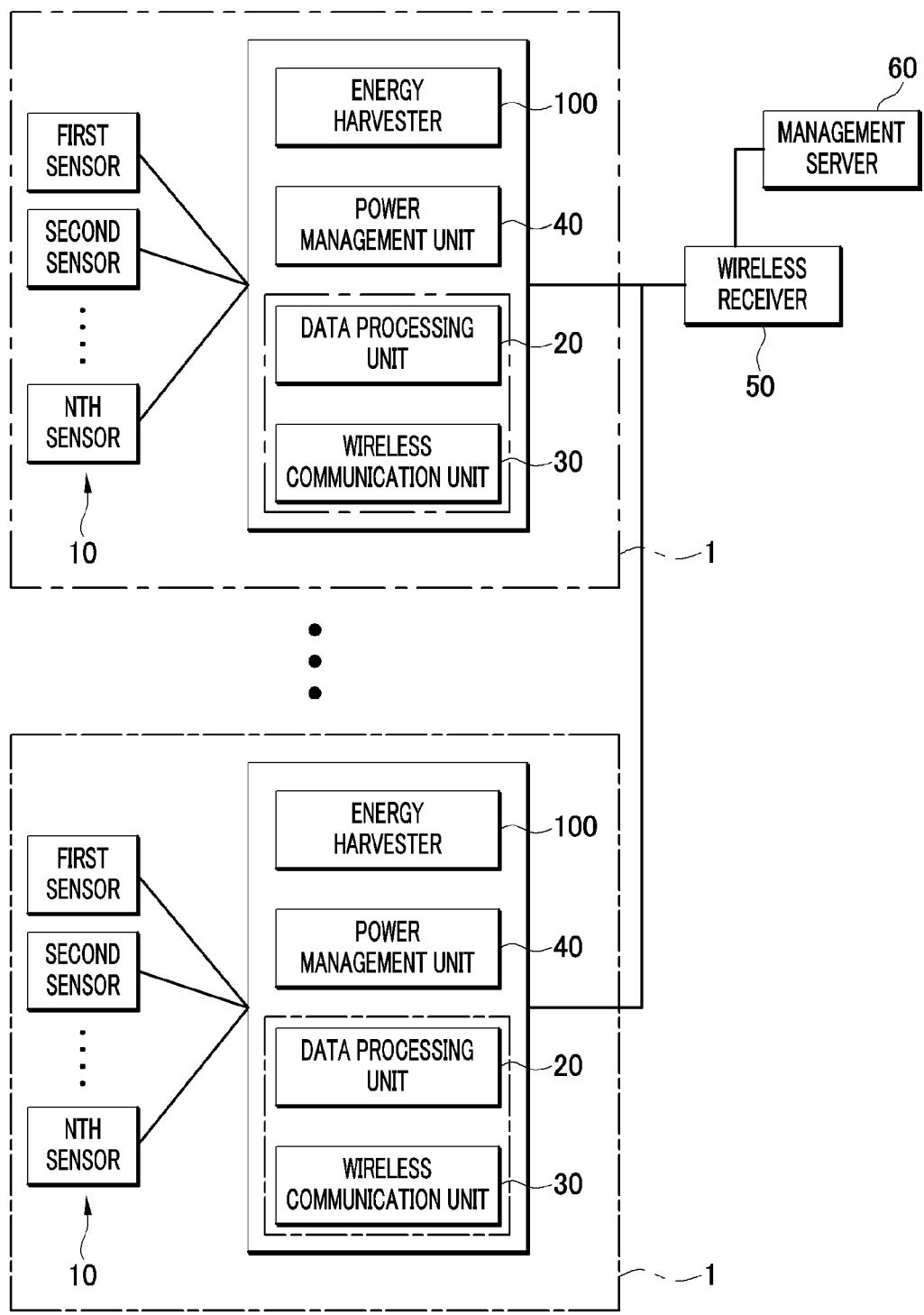
FIG. 1 is a schematic diagram of an engine monitoring system using an energy harvester according to an embodiment of the present application.

Hereinafter, embodiments of the present application will be described in detail with reference to the accompanying drawings such that those skilled in the art to which the present application belongs can easily implement. However, the present application can be implemented in various different forms and is not limited to the embodiments described herein. In addition, in the drawings, portions not related to the description are omitted to clearly describe the present application, and similar reference numerals are attached to similar portions throughout the specification.

Throughout the specification of the present application, when a certain portion is described to be "connected" to the other portion, this includes not only a case in which the portion is "directly connected" to the other portion but also a case in which the portion is "electrically connected" to the other portion through another portion.

Throughout the specification of the present application, when a member is located "on" the other member, this includes not only a case in which a member is in contact with the other member, but also a case in which another member exists between the two members.

In the entire specification of the present application, when a certain portion "includes" a certain element, this means that the certain portion can further include other elements rather than excluding other elements unless otherwise stated. Terms "approximately", "substantially", etc. described throughout the specification of the present application indicate the numerical value or a value close to the numerical value when manufacturing and material tolerances specific to the stated meaning are presented, and are used to prevent the disclosure in which accurate or absolute numerical values are described to aid understanding of the present application from being unfairly used by unscrupulous infringers. A term "step (to)" or "step of", which is used throughout the specification of the present application, does not mean "step for".

The present invention relates to an energy harvester and an engine monitoring system using the same. For example, the engine monitoring system using the energy harvester of the present invention can be coupled to an existing engine as well as a new engine by an add-on method and can conveniently configure a wireless sensor monitoring system through a procedure of registering in a management server.

Figure 9:
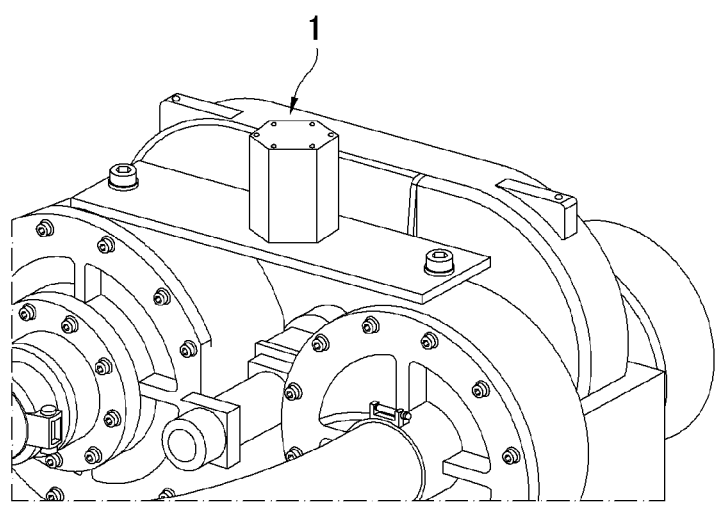
FIG. 9 is a view illustrating an example in which an engine monitoring system using the energy harvester according to the embodiment of the present invention is coupled to an engine.

For example, as illustrated in FIG. 9, in the engine monitoring system using the energy harvester of the present invention, a bracket configuration for coupling with an engine can be coupled to the outside of the engine monitoring system.

Figure 2:
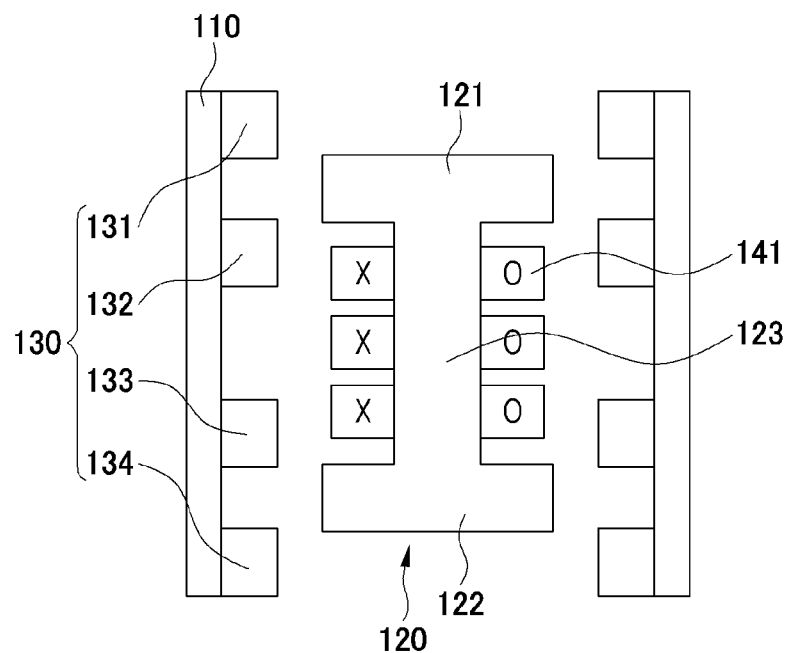
FIG. 2 is a conceptual diagram of the energy harvester according to the embodiment of the present invention.
Figure 3A:
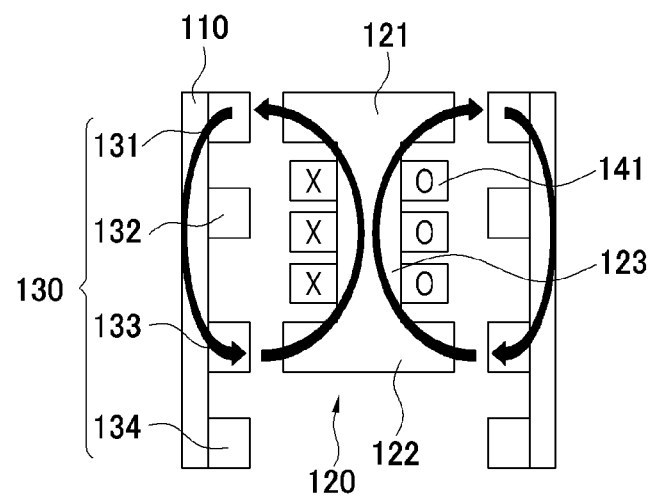
FIGS. 3A and 3B are an example diagram of an operation of the energy harvester according to the embodiment of the present invention.
Figure 3B:
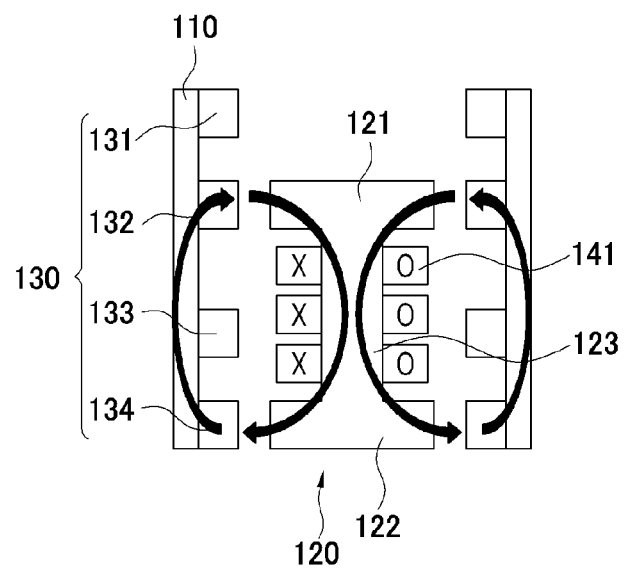
Figure 4:
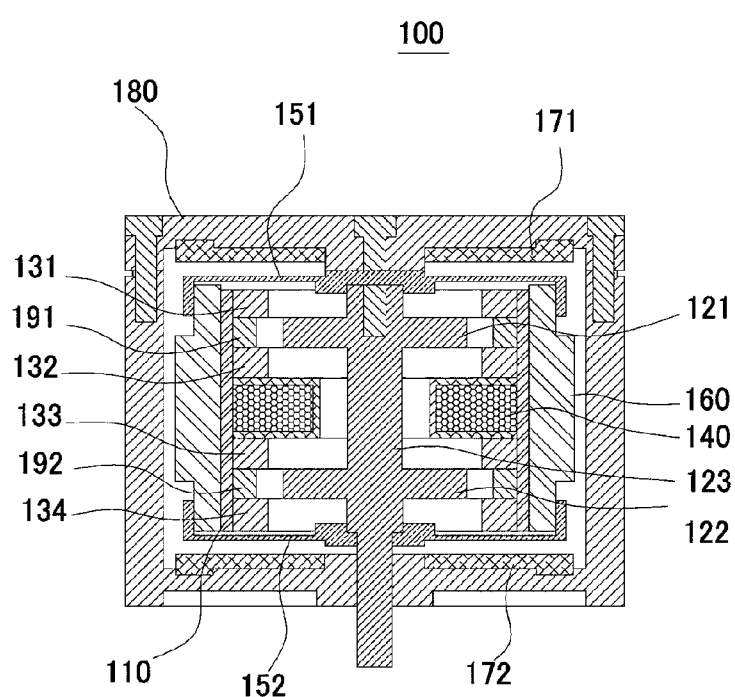
FIG. 4 is a cross-sectional view of an energy harvester according to a first embodiment of the present invention.
Figure 5A:
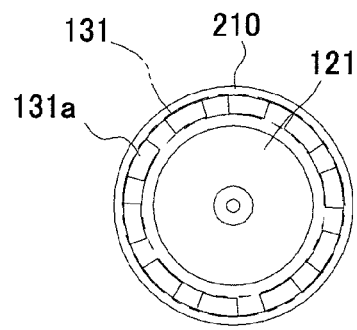
FIGS. 5A to 5C are a cross-sectional view of the energy harvester according to the first embodiment of the present invention as viewed from another side.
Figure 5B:
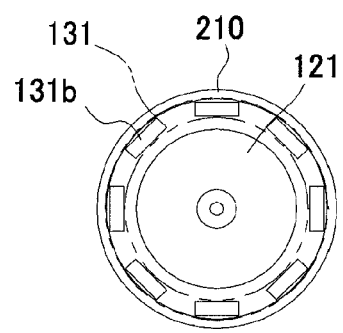
Figure 5C:
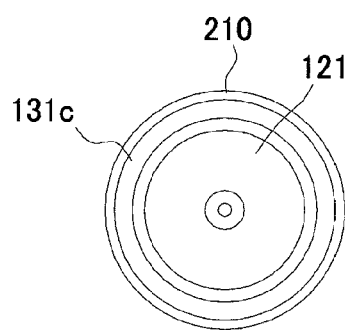
Figure 6:
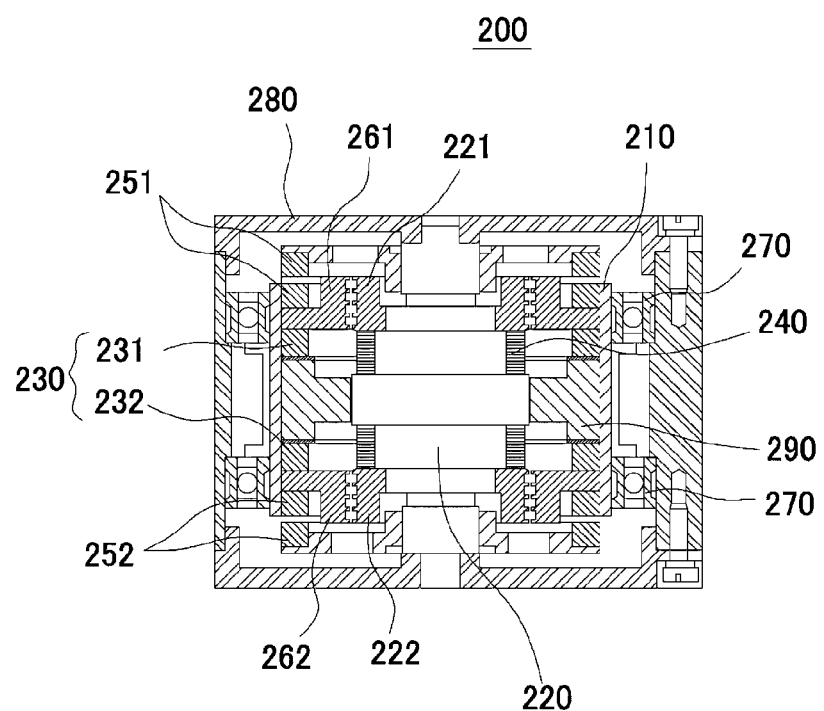
FIG. 6 is a cross-sectional view of an energy harvester according to a second embodiment of the present invention.
Figure 7:
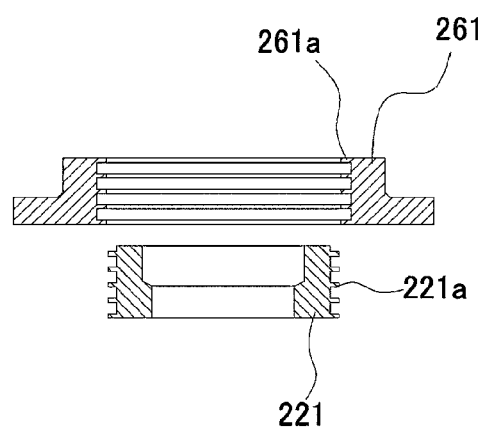
FIG. 7 is a view illustrating an internal magnetic conductor and an external magnetic conductor of the present invention.
Figure 8:
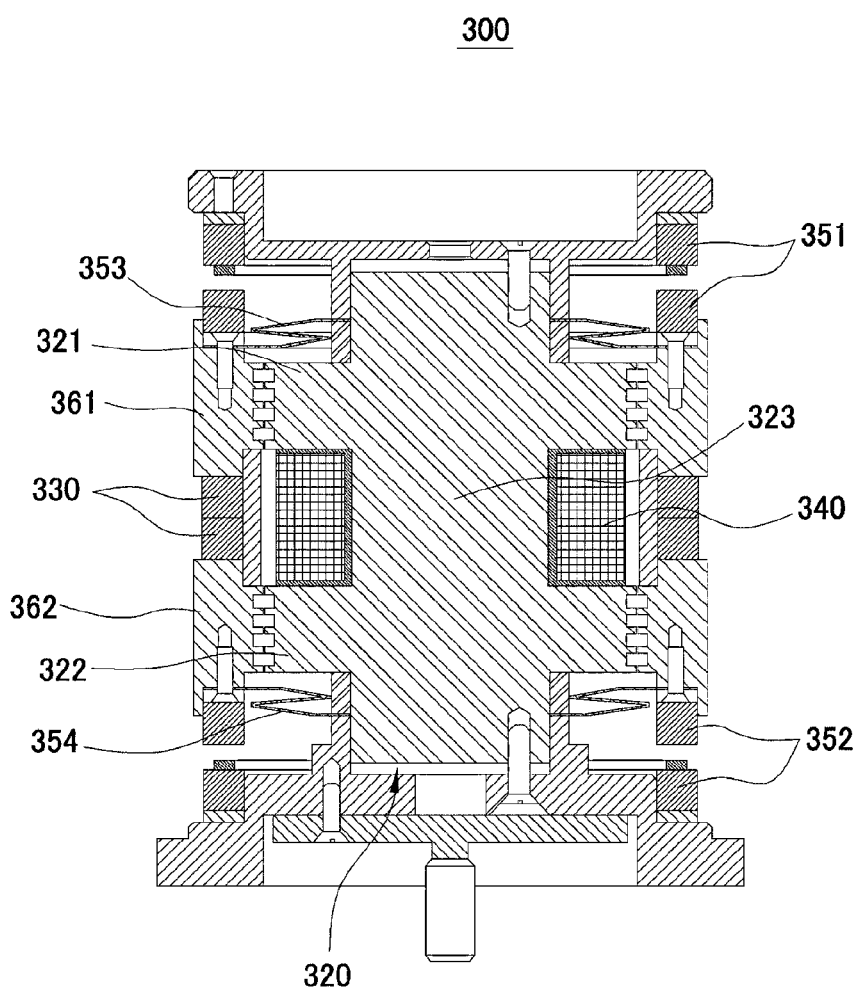
FIG. 8 is a cross-sectional view of an energy harvester according to a third embodiment of the present invention.

FIG. 1 is a schematic diagram of an engine monitoring system using an energy harvester according to an embodiment of the present application. FIG. 2 is a conceptual diagram of the energy harvester according to the embodiment of the present invention. FIG. 3 is an example diagram of an operation of the energy harvester according to the embodiment of the present invention. FIG. 4 is a cross-sectional view of an energy harvester according to a first embodiment of the present invention. FIG. 5 is a cross-sectional view of the energy harvester according to the first embodiment of the present invention as viewed from another side. FIG. 6 is a cross-sectional view of an energy harvester according to a second embodiment of the present invention. FIG. 7 is a view illustrating an internal magnetic conductor and an external magnetic conductor of the present invention. FIG. 8 is a cross-sectional view of an energy harvester according to a third embodiment of the present invention. FIG. 9 is a view illustrating an example in which an engine monitoring system using the energy harvester according to the embodiment of the present invention is coupled to an engine.

Referring to FIG. 1, an engine monitoring system using an energy harvester according to an embodiment of the present invention generates electric energy by using an energy harvester 100, and includes at least one or more self-power generation wireless sensor nodes 1 for monitoring an engine and a management server 60 that receives and manages sensing information received from the self-power generation wireless sensor nodes 1.

In addition, each of the self-power generation wireless sensor nodes 1 includes sensor modules 10, a data processing unit 20, a wireless communication unit 30, an energy harvester 100, and a power management unit 40. For example, the data processing unit 20 and the wireless communication unit 30 can be integrally formed as one configuration, but are not limited thereto, and can be formed separately into each composition of the data processing unit 20 and the wireless communication unit 30.

Each sensor module 10 is a sensor that monitors an engine and can include a plurality of sensors to measure various physical quantity parameters such as vibration, temperature, pressure, displacement, and torque generated in the engine. In addition, the plurality of sensors can be respectively mounted on a portion where engine monitoring is required, and for example, can be mounted on a high-speed turbocharger for driving an engine, a shaft bearing, or the like.

The data processing unit 20 identifies and packages the received sensing information.

The wireless communication unit 30 wirelessly transmits the packaged sensing information received from the data processing unit 20 to the management server 60. In other words, the management server 60 includes a wireless receiver 50 that wirelessly receives the packaged sensing information wirelessly transmitted from the wireless communication unit 30 and can process the packaged sensing information wirelessly received from the wireless receiver 50.

The energy harvester 100 converts vibration energy of an engine into electric energy to generate electric energy supplied to the sensor modules 10, the data processing unit 20, and the wireless communication unit 30. Detailed description thereof will be made below.

The power management unit 40 controls the electric energy generated by the energy harvester 100 to supply the electric energy to the sensor modules 10, the data processing unit 20, and the wireless communication unit 30.

For example, the power management unit 40 can include a super capacitor or a battery that stores the collected electric energy. In addition, when a voltage of the super capacitor or the battery reaches a preset threshold, the power management unit 40 can supply power to the wireless communication unit 30 to transmit the collected data.

In addition, the power management unit 40 can control whether or not to enter an operation and power saving mode according to the power generated by the energy harvester.

In detail, when the amount of power generation does not reach the threshold, the power management unit 40 enters a power saving mode to extend a transmission period for transmitting sensing information collected by the sensor modules 10 to the management server, and thus, it is possible to minimize power consumption generated during data transmission. In addition, when the amount of power generation is recovered to the threshold or more, the power management unit 40 can return to a normal mode to return a data wireless transmission period to a normal period again. Accordingly, an engine monitoring system using an energy harvester can cope with a case in which the energy harvester 100 does not smoothly generate electric energy.

In addition, when the amount of data to be transmitted is collected as much as a preset value, the wireless communication unit 30 transmits data, and when the amount of power generation is insufficient, the wireless communication unit 30 can stand by until power capable of transmitting all the collected data is collected, and then transmit data.

Hereinafter, concept of the energy harvester 100 according to the present invention will be described with reference to FIG. 2. For reference, the energy harvester 100 of FIG. 2 is a cross-sectional view and can have a cylindrical shape as a whole and is not limited thereto.

The energy harvester 100 includes an iron core 120, a plurality of magnets 130, and a coil 140.

The iron core 120 includes a central shaft 123, an upper iron core portion 121 formed to extend horizontally from the central shaft 123, and a lower iron core portion 122 formed to extend horizontally from the central shaft 123.

For example, the central shaft 123 can be formed in a cylindrical shape, the upper iron core portion 121 of a disk shape can be located at an upper end of the central shaft 123, and the lower iron core portion 122 of a disk shape can be located at a lower end of the central shaft 123, which are not limited thereto.

The plurality of magnet portions 130 can be arranged on an inner peripheral surface of a first housing 110 to face an outer peripheral surface of the iron core 120, and can be spaced apart from each other by a predetermined interval along an extending direction of the central shaft 123. For example, the plurality of magnet portions 131, 132, 133, and 134 can be located along an inner peripheral surface of the first housing 110, and an inner circumference and an outer circumference can be formed with opposite polarities to each other, which is not limited thereto. In addition, the first housing 110 can be a magnetic member which is a material having properties of magnetizing in a magnetic field.

The coil 140 is wound around the central shaft 123 of the iron core 120 or surrounds the iron core 120 and is disposed along the inner peripheral surface of the first housing 110 between the magnet portions 130. In other words, the coil 140 can be wound on the outer peripheral surface of the central shaft 123 of the iron core 120 as illustrated in FIG. 2 or can be disposed along the inner peripheral surface of the first housing 110 between a second magnet portion 132 and a third magnet portion 133 which will be described below, as illustrated in FIG. 4.

In the energy harvester 100, a matching state of the upper iron core portion 121 and the lower iron core portion 122 of the iron core 120 and the magnet portion 130 is adjusted depending on the degree of linear vibration of the iron core 120 or the plurality of magnet portions 130, and when the upper iron core portion 121, the lower iron core portion 122, and the magnet portion 130 match each other, the energy harvester 100 operates to form a magnetic flux closed loop passing through the iron core 120 and the magnet portion 130. Detailed description thereof will be made below.

The plurality of magnet portions 130 can include a first magnet portion 131, the second magnet portion 132, the third magnet portion 133, and a fourth magnet portion 134 which are arranged to be spaced apart in an extension direction of the central shaft 123. The present invention is not limited thereto, and the plurality of magnet portions 130 can be composed of 6, 8 or more magnet portions depending on displacement of vibration.

In addition, in the energy harvester 100, when the iron core 120 moves to an uppermost end according to a vertical movement of the iron core 120 or the plurality of magnet portions 130, the upper iron core portion 121 and the first magnet portion 131 can face each other and the lower iron core portion 122 and the third magnet portion 133 can face each other, and when the iron core 120 moves to a lowermost end, the upper iron core portion 121 and the second magnet portion 132 can face each other and the lower iron core portion 122 and the fourth magnet portion 134 can face each other. As described above, the fact that the iron core 120 moves to the uppermost end means that the iron core 120 moves in an upper direction or the plurality of magnet portions 130 move in a lower direction to cause the iron core 120 relatively moves in the lower direction, and the fact that the iron core 120 moves to the lowermost end means that the iron core 120 moves in a lower direction or the plurality of magnet portions 130 move in an upper direction to cause the iron core 120 relatively moves in the lower direction.

In other words, when the iron core 120 moves to the uppermost end according to the vertical movement of the iron core 120, a magnetic flux of a closed loop form passing through the upper iron core portion 121, the first magnet portion 131, the third magnet portion 133, and the lower iron core portion 122 can be formed, and when the iron core 120 moves to the lowermost end according to the vertical movement of the iron core 120, a magnetic flux of a closed loop form passing through the upper iron core portion 121, the second magnet portion 132, the fourth magnet portion 134, and the lower iron core portion 122 can be formed.

For example, the plurality of magnet portions 130 have an inner circumference and an outer circumference formed with opposite polarities to each other, and the inner circumference of the first magnet portion 131 and the inner circumference of the third magnet portion 133 can be formed to have opposite polarities, and the inner circumference of the second magnet portion 132 and the inner circumference of the fourth magnet portion 134 can be formed to have opposite polarities, and the inner circumference of the first magnet portion 131 and the inner circumference of the second magnet portion 132 can be formed to have opposite polarities.

For example, the first magnet portion 131 can have an inner circumference of an S polarity and an outer circumference of an N polarity, the second magnet portion 132 can have an inner circumference of N polarity and an outer circumference of S polarity, the third magnet portion 133 can have an inner circumference of an N polarity and an outer circumference of an S polarity, and the fourth magnet portion 134 can have an inner circumference of an N polarity and an outer circumference of an S polarity. However, the present invention is not limited thereto, and referring to (a) and (b) of FIG. 5, each of the magnet portions 131, 132, 133, and 134 is configured by a plurality of magnets 131a or 131b, and the plurality of magnets 131a or 131b can be located along an inner peripheral surface of the first housing 110, and an inner circumference and an outer circumference can be formed with opposite polarities to each other. In addition, the magnet 131a can be formed in a trapezoidal or rectangular shape in cross section, as illustrated in (a) and (b) of FIG. 5. However, the present invention is not limited thereto, and each of the magnet portions 131, 132, 133, and 134 can be formed of a single magnet 131c having a circular shape in cross section, as illustrated in (c) of FIG. 5.

Accordingly, referring to (a) of FIG. 3, when the iron core 120 is located at the uppermost end, a magnetic flux can be formed in an upper direction from the iron core 120, and referring to (b) of FIG. 3, when the iron core 120 is located at the lowermost end, a magnetic flux can be formed in a lower direction from the iron core 120. Accordingly, a direction of the magnetic flux passing through the coil 140 is changed from a forward direction to a reverse direction, and thus, there are effects that electromagnetic induction efficiency is increased and efficiency is maximized by a closed loop without leakage magnetic flux.

Referring to FIG. 4, the energy harvester 100 according to a first embodiment of the present invention will be described.

The first housing 110 can be formed in a cylindrical shape, and the plurality of magnet portions 130 arranged in an extension direction of the central shaft 123 can be located on an inner peripheral surface. In addition, the upper iron core portion 121 and the lower iron core portion 122 can be formed in a disk shape extending from the central shaft 123 and are not limited thereto.

In addition, the energy harvester 100 can further include a first spacer 191 between the first magnet portion 131 and the second magnet portion 132 and include a second spacer 192 between the third magnet portion 133 and the fourth magnet portion 134, and the coil 140 can be located between the second magnet portion 132 and the third magnet portion 133.

Accordingly, in the energy harvester 100, when the iron core 120 is located at the uppermost end, a magnetic flux passing through the first magnet portion 131, the first housing 110, the third magnet portion 133, the lower iron core portion 122, the central shaft 123, and the upper iron core portion 121 can be formed, and when the iron core 120 is located at the lowermost end, a magnetic flux passing through the fourth magnet portion 134, the first housing 110, the second magnet portion 132, the upper iron core portion 121, the central shaft 123, and the lower iron core portion 122 can be formed. In this case, the coil 140 can be located between the second magnet portion 132 and the third magnet portion 133 to form a magnetic flux in the same direction as the magnetic flux of the central shaft 123.

The energy harvester 100 can further include a mass body 160 located on an outer peripheral surface of the first housing 110. Accordingly, the first to fourth magnet portions 131, 132, 133, and 134 can move more smoothly in the vertical direction.

The energy harvester 100 can further include an upper spring portion 151 that is fixed to an upper portion of the central shaft 123 and elastically supports the first to fourth magnet portions 131, 132, 133, and 134 to linearly vibrate in the vertical direction, and a lower spring portion 152 that is fixed to a lower portion of the central shaft 123 and elastically supports the first to fourth magnet portions 131, 132, 133, and 134 to linearly vibrate in the vertical direction. For example, the upper spring portion 151 and the lower spring portion 152 can be plate springs and are not limited thereto.

In detail, in the energy harvester 100, the first to fourth magnet portions 131, 132, 133, and 134 can be linearly vibrated in a vertical direction by the upper spring portion 151 and the lower spring portion 152. In addition, when the first to fourth magnet portions 131, 132, 133, and 134 move to the lowermost end, a magnetic flux of a closed loop form passing through the upper iron core portion 121, the first magnet portion 131, the first housing 110, the third magnet portion 133, the lower iron core portion 122, and the central shaft 123 can be formed, and when the first to fourth magnet portions 131, 132, 133, and 134 move to the uppermost end, a magnetic flux of a closed loop form passing through the upper iron core portion 121, the central shaft 123, the lower iron core portion 122, the fourth magnet portion 134, the first housing 110, and the second magnet portion 132 can be formed. In other words, as the first to fourth magnet portions 131, 132, 133, and 134 linearly vibrate in the vertical direction, a direction of the magnetic flux passing through the coil 140 is changed to generate electric energy.

In some cases, an upper stopper 171 is located on an upper inner peripheral surface of the second housing 180, and a lower stopper 172 is located on a lower inner peripheral surface to limit a distance at which the first magnet portion 131 to the fourth magnet portion 134 linearly vibrate, and thereby, life spans of the upper and lower spring portions 151 and 152 are increased and shock can be absorbed.

Hereinafter, an energy harvester 200 according to a second embodiment of the present invention will be described with reference to FIG. 6.

The energy harvester 200 according to the second embodiment of the present invention includes a power generation core, at least one or more magnet portions 230, and external magnetic conductors 261 and 262.

The power generation core includes an iron core 220, a coil 240 wound around the core 220, a first internal magnetic conductor 221 that is disposed above the coil 240 and is coupled to surround an upper end of the iron core 220, and a second internal magnetic conductor 222 that is disposed below the coil 240 and is coupled to surround a lower end of the iron core 220.

The magnet portion 230 is disposed on an inner peripheral surface of the first housing 210 to face an outer peripheral surface of the power generation core.

The external magnetic conductors 261 and 262 include a first external magnetic conductor 261 that is located over the magnet portion 230 and disposed to face the first internal magnetic conductor 221, and a second external magnetic conductor 262 that is located under the magnetic portion 230 and disposed to face the second internal magnetic conductor 222. In addition, a plurality of magnet portions 230, the first external magnetic conductor 261, and the second external magnetic conductor 262 linearly vibrate along the power generation core due to external vibration, and thereby, electric energy can be generated. Detailed description thereof will be made below.

Each of the internal magnetic conductors 221 and 222 and each of the external magnetic conductors 261 and 262 respectively include a plurality of protrusions (sawteeth) 221a and 261a protruding to the outside, and when vibrating, the respective protrusions 221a and 261a can deviate from each other or face each other to form a closed loop. In addition, when stopping, the respective protrusions 221a and 261a can face each other or deviate from each other. In addition, the external magnetic conductors 261 and 262 and the internal magnetic conductors 221 and 222 each have a cylindrical shape, and have a concentric circle relationship of a form in which the internal magnetic conductors 221 and 222 are included in the external magnetic conductors 261 and 262.

For example, referring to FIG. 6, the internal magnetic conductors 221 and 222 can be formed in a cylindrical shape, protrude from an outer peripheral surface, and spaced apart from each other by a predetermined distance in the vertical direction to form the plurality of protrusions 221a, and the external magnetic conductors 261 and 262 can be formed in a cylindrical shape, has the internal magnetic conductors 221 and 222 located therein, protrude from an inner peripheral surface, and spaced apart from each other by a predetermined distance in the vertical direction to form the plurality of protrusions 261a. In addition, referring to FIG. 6, the protrusions 221a of the internal magnetic conductors 221 and 222 and the protrusions 261a of the external magnetic conductors 261 and 262 can be composed of five pieces or can be formed to be the same or less without being limited thereto.

In addition, the plurality of magnet portions 230 can include a first magnet portion 231 and a second magnet portion 232 spaced apart by a predetermined interval in an extension direction of the iron core 220. In addition, the first external magnetic conductor 261 can be disposed over the first magnet portion 231, and the second external magnetic conductor 262 can be disposed under the second magnet portion 232.

In addition, the energy harvester 200 can further include a central magnetic conductor 290 that is disposed between the first magnet portion 231 and the second magnet portion 232 and has a shape extending toward the iron core 220.

Accordingly, in the energy harvester 200, a magnetic flux of a closed loop form passing through the first internal magnetic conductor 221, the first external magnetic conductor 261, the central magnetic conductor 290, and the iron core 220 can be formed, and a magnetic flux of a closed loop form passing through the second internal magnetic conductor 222, the second external magnetic conductor 262, the central magnetic conductor 290, and the iron core 220 can be formed.

In addition, the first magnet portion 231 and the second magnet portion 232 are formed with upper and lower polarities opposite to each other, and an upper portion of the first magnet portion 231 and an upper portion of the second magnet portions 232 can be formed with opposite polarities to each other. In addition, the plurality of magnet portions 230 can be formed in a circular ring shape or can have a ring shape of a rectangular shape, a hexagonal shape, an octagonal ring shape, or more without being limited thereto. However, the present invention is not limited thereto, and the first magnet portion 231 and the second magnet portion 232 can each include a plurality of magnets and can be formed by arranging a plurality of magnets in a circular shape.

For example, the first magnet portion 231 can have an upper portion of an N polarity and a lower portion of an S polarity, and the third magnet portion 233 can have an upper portion of an S polarity and a lower portion of an N polarity.

Accordingly, in the energy harvester 200, a magnetic flux of a closed loop form passing through the first magnet portion 231, the first external magnetic conductor 261, the first internal magnetic conductor 221, the iron core 220, and a magnetic flux of a closed loop form passing through the second magnet portion 232, the second external magnetic conductor 262, the second internal magnetic conductor 222, the iron core 220, and the central magnetic conductor 290 can be formed.

In addition, when vibration occurs, the plurality of magnet portions 230 vibrate, and at this time, the protrusions 221a of the internal magnetic conductors 221 and 222 and the protrusions 261a of the external magnetic conductors 261 and 262 deviate from each other, and thereby, the amount of change in magnetic flux passing through the internal magnetic conductors 221 and 222 and the external magnetic conductors 261 and 262 can be increased. In other words, the energy harvester 200 has a very large change in magnetic flux even with a small vibration equal to an interval between the protrusions 221a and 261a, and thus, power generation efficiency is increased. That is, the energy harvester 200 according to the second embodiment of the present invention has an effect that can efficiently generate electric energy with a small vibration through the internal magnetic conductors 221 and 222 and the external magnetic conductors 261 and 232 formed with protrusions as compared to the energy harvester 100 according to the first embodiment.

In addition, the energy harvester 200 can include an upper magnetic spring 251 disposed over the first external magnetic conductor 261 and a lower magnetic spring 252 disposed under the second external magnetic conductor 262. The magnetic springs have general configurations, and thus, detailed description thereof will be omitted.

The energy harvester 200 can further include a second housing 280 which has a predetermined space formed therein and to which the iron core 220 is fixed, and at least one or more bearing portions 270 located between a peripheral portion of the first housing 210 and the second housing 280. In other words, the energy harvester 200 can further stabilize a plurality of movements through the bearing portions 270.

Hereinafter, an energy harvester 300 according to a third embodiment of the present invention will be described with reference to FIG. 8.

The iron core 320 includes a central shaft 323, a first internal magnetic conductor 321 formed to extend in a horizontal direction from the central shaft 323, and a second internal magnetic conductor 322 formed to extend in the horizontal direction from the central shaft 323. For example, the central shaft 323 can be formed in a cylindrical shape, the first internal magnetic conductor 321 of a disk shape is located at an upper end of the central shaft 323, and the second internal magnetic conductor 322 is located at a lower end of the central shaft 323, which are not limited thereto.

In addition, external magnetic conductors 361 and 362 include a first external magnetic conductor 361 that is located over a magnet portion 330 and is disposed to face the first internal magnetic conductor 321, and a second external magnetic conductor 362 that is located under the magnet portion 330 and is disposed to face the second internal magnetic conductor 322.

In addition, the internal magnetic conductors 321 and 322 include a plurality of protrusions formed on peripheral surfaces, the external magnetic conductors 361 and 362 include a plurality of protrusions formed on inner circumferences, and when stopped, the respective projections face each other or deviate from each other.

In addition, the magnet portion 330, the first external magnetic conductor 361, and the second external magnetic conductor 362 linearly vibrate along the iron core 320 due to an external vibration, and at this time, the protrusions of the internal magnetic conductors 321 and 322 and the protrusions of the external magnetic conductors 361 and 362 face each other or deviate from each other repeatedly, and thus, the amount of change in magnetic flux passing through the internal magnetic conductors 321 and 322 and the external magnetic conductors 361 and 362 increases, resulting in an increase in power generation efficiency.

The energy harvester 300 according to the third embodiment of the present invention has an effect of efficiently generating electric energy with a small vibration through the internal magnetic conductors 321 and 322 and the external magnetic conductors 361 and 332 having projections formed thereon as compared to the energy harvester 100 according to the first embodiment.

A coil 340 is wound around the central shaft 323 and is located between the first internal magnetic conductor 321 and the second internal magnetic conductor 322.

The magnet portion 330 can be disposed to face an outer peripheral surface of the iron core and disposed to face an outer peripheral surface of the coil 340 as illustrated in FIG. 8 and is not limited thereto. In addition, the magnet portion 330 can be composed of one magnet but can be composed of a plurality of magnets stacked in a vertical direction.

In the energy harvester 300 according to the third embodiment of the present invention, a magnetic flux of a closed loop form passing through the magnet portion 330, the first external magnetic conductor 361, the first internal magnetic conductor 321, the central shaft 323, the second internal magnetic conductor 322, and the second external magnetic conductor 362 can be formed.

The energy harvester 300 according to the third embodiment of the present invention can further include an upper plate spring 353 disposed over the first external magnetic conductor 361, and a lower plate spring 354 disposed under the second external magnetic conductor 362.

For example, the upper plate spring 353 is formed in a disk shape with a hole formed in the center thereof, has an outer circumference fixed to the first internal magnetic conductor 321, and has an inner circumference that can be fixed to an upper portion of the iron core 320. In addition, the lower plate spring 354 can be formed in a disk shape with a hole formed in the center thereof, has an outer circumference fixed to the second internal magnetic conductor 322, and has an inner circumference that can be fixed to a lower portion of the iron core 320.

In addition, the energy harvester 300 according to the third embodiment of the present invention can further include an upper magnetic spring portion 351 disposed over the first external magnetic conductor 361 and a lower magnetic spring portion 352 disposed under the second external magnetic conductor 362.

In other words, the energy harvester 300 according to the third embodiment of the present invention can elastically support the magnet portion 330 by using the lower and upper plate springs 353 and 354 made of plate springs and the upper and lower magnetic spring portions 351 and 352 using magnets.

The above description of the present application is for illustrative purposes only, and those skilled in the art to which the present application belongs will be able to understand that the technical idea or essential features of the present application can be modified to other specific forms without change. Therefore, it should be understood that the embodiments described above are illustrative in all respects and not restrictive. For example, each configuration element described as a single type can also be implemented in a distributed manner, and similarly, configuration elements described as being distributed can be implemented in a combined form.

The scope of the present application is represented by the claims to be described below rather than the detailed description, and all changes or modified forms derived from the meaning and scope of the claims and their equivalent concepts should be interpreted as being included in the scope of the present application.

EXPLANATION OF CODES 100, 200, 300: energy harvester
110, 210: first housing
120, 220, 320: iron core
121: upper iron core portion
122: lower iron core portion
123, 323: central shaft
130, 230, 330: magnet portion
131, 231: first magnet portion
132, 232: second magnet portion
133: third magnet portion
134: fourth magnet portion
140, 240, 340: coil
151: upper spring portion
152: lower spring portion
251, 351: upper magnetic spring
252, 352: lower magnetic spring
353: upper plate spring
354: lower plate spring
160: mass body
171: upper stopper
172: lower stopper
180: second housing
191: first spacer
192: second spacer
221, 321: first internal magnetic conductor
222, 322: second internal magnetic conductor
261, 361: first external magnetic conductor
262, 362: second external magnetic conductor
270: bearing portion
290: central magnetic conductor
1: self-power generation wireless sensor node
10: sensor module
20: data processing unit
30: wireless communication unit
50: wireless receiver
60: management server

The invention claimed is:

1. An engine monitoring system using an energy harvester, comprising:
   at least one or more self-power generation wireless sensor nodes for generating electric energy using the energy harvester and monitoring an engine; and
   a management server that receives and manages sensing information received from the self-power generation wireless sensor nodes,
   wherein each of the self-power generation wireless sensor nodes comprises:
      at least one or more sensor modules that monitor the engine;
      a data processing unit that identifies and packages sensing information received from the sensor modules;
      a wireless communication unit that wirelessly transmits the packaged sensing information received from the data processing unit to the management server;
      the energy harvester that generates electric energy to be supplied to the sensor modules, the data processing unit, and the wireless communication unit by converting vibration energy of the engine into the electric energy; and
      a power management unit that controls the electric energy generated by the energy harvester to supply the electric energy to the sensor modules, the data processing unit, and the wireless communication unit,
   wherein the energy harvester comprises:
      an iron core of a bobbin shape that includes a central shaft, an upper iron core portion formed to extend horizontally from the central shaft, and a lower iron core portion formed to extend horizontally from the central shaft;
      a plurality of magnet portions that is disposed on an inner peripheral surface of a first housing to face an outer peripheral surface of the iron core and is disposed in an extension direction of the central shaft; and
      a coil that is wound around the iron core or surrounds the iron core and is disposed along the inner peripheral surface of the first housing between the magnet portions, and
   wherein a state in which the upper and lower iron core portions of the iron core and the magnet portions match each other is adjusted according to a degree of linear vibration of the iron core or the plurality of magnets, and when the upper and lower iron core portions and the magnet portions match each other, a magnetic flux passing through the iron core and the magnet portions forms a closed loop,
   wherein the plurality of magnet portions include first magnet portion to fourth magnet portion spaced apart from each other by a predetermined interval along the extending direction of the central shaft,
   wherein, when the iron core moves to an uppermost end or the plurality of magnets move to a lowermost end according to vertical movement of the iron core or the plurality of magnets, the upper iron core portion and the first magnet portion are disposed to face each other, and the lower iron core portion and the third magnet portion are disposed to face each other, and
   wherein, when the iron core moves to a lowermost end or the plurality of magnets move to the uppermost end according to the vertical movement of the iron core or the plurality of magnets, the upper iron core portion and the second magnet portion are disposed to face each other, and the lower iron core portion and the fourth magnet portion are disposed to face each other.

2. The engine monitoring system of claim 1,
   wherein the power management unit controls whether or not to enter an operation and power saving mode according to a power generated by the energy harvester.

3. The engine monitoring system of claim 1,
   wherein the wireless communication unit performs data transmission when an amount of data to be transmitted is collected as much as a preset value, and stands by until power for transmitting all collected data is collected and transmits the data when the amount of power generation is insufficient.

4. The engine monitoring system of claim 1, further comprising:
   a first spacer located between the first magnet portion and the second magnet portion; and
   a second spacer located between the third magnet portion and the fourth magnet portion.

5. The engine monitoring system of claim 1, further comprising:
   a mass body located on an outer peripheral surface of the first housing.

6. The engine monitoring system of claim 1, further comprising:
   an upper spring portion that is fixed to an upper portion of the central shaft and elastically supports the first magnet portion to the fourth magnet portion to linearly vibrate in a vertical direction; and
   a lower spring portion that is fixed to a lower portion of the central shaft and elastically supports the first magnet portion to the fourth magnet portion to linearly vibrate in the vertical direction.

7. The engine monitoring system of claim 1, further comprising:
   a second housing in which a predetermined space is formed and to which the central shaft is fixed;
   an upper stopper located on an upper inner peripheral surface of the second housing; and
   a lower stopper located on a lower inner peripheral surface of the second housing.

8. The engine monitoring system of claim 1,
   wherein, when the iron core moves to the uppermost end or the plurality of magnets move to the lowermost end according to the vertical movement of the iron core or the plurality of magnets, a magnetic flux of a closed loop form passing through the upper iron core portion, the first magnet portion, the third magnet portion, and the lower iron core portion is formed, and
   wherein, when the iron core moves to the lowermost end or the plurality of magnets move to the uppermost end according to the vertical movement of the iron core or the plurality of magnets, a magnetic flux of a closed loop form passing through the upper iron core portion, the second magnet portion the fourth magnet portion, and the lower iron core portion is formed.

9. The engine monitoring system of claim 8,
   wherein the plurality of magnet portions have inner circumferences and outer circumferences formed in opposite polarities, and
   wherein the inner circumference of the first magnet portion and the inner circumference of the third magnet portion are formed with opposite polarities to each other, the inner circumference of the second magnet portion and the inner circumference of the third magnet portion are formed with opposite polarities to each other, and the inner circumference of the first magnet portion and the inner circumference of the second magnet portion are formed with opposite polarities to each other.

* * * * *